Figure 1:

Oct. 26, 1965     L. PÉRAS     3,214,250
REFRACTORY AND COHESIVE MATERIALS HAVING METALLIC PHASE AND
CERAMIC PHASE, METHOD OF PRODUCING SAME AND
METHOD OF COATING USING SAME
Filed Feb. 3, 1961

United States Patent Office 3,214,250
Patented Oct. 26, 1965

3,214,250
REFRACTORY AND COHESIVE MATERIALS HAVING METALLIC PHASE AND CERAMIC PHASE, METHOD OF PRODUCING SAME AND METHOD OF COATING USING SAME
Lucien Péras, Billancourt, France, assignor to Regie Nationale des Usines Renault, Billancourt, France
Filed Feb. 3, 1961, Ser. No. 86,997
Claims priority, application France, Feb. 12, 1960, 818,396, Patent 1,257,079
12 Claims. (Cl. 29—182.5)

This invention relates to a novel cohesive and refractory material remarkable notably through its exceptional resistance to alteration in the very hot state, whether by a molten metal or by gases heated at a relatively high temperature. The interest of materials having these properties is well known. Many designs and plans theoretically feasible are barred by difficulties arising from an insufficient behaviour of the materials. The technological difficulties set a limit to many constructions which could otherwise reasonably be expected from the continuous advance of science.

The novel material constituting the subject-matter of this invention is a "cermet" (from ceramic and metal), that is, a juxtaposition of metal and metal oxide in a compact material. This new cermet is characterized in that the metal oxide or ceramic component is a high-alumina bauxite, and that the metal component comprises at least 5% chromium, or aluminium, or a mixture of both metals. This material is elaborated in mass form through the methods of powder metallurgy or, if desired, in the form of a thin layer or coating for protecting another metallic or cerametallic substance; it can be sprayed in powder form or in the form of sintered rods through the known method of gun metallization, the minimum thickness of the sprayed layer being about .004".

In addition to the fact that bauxite imparts novel and unexpected properties to the cermet of which it is a component element, its low cost constitutes an important economical factor whereby a cheap material can be obtained which is remarkably cheaper than alumina. Besides, this difference in cost between the two cermets results not only from the difference in price between bauxite and alumina, but also and more particularly from the fact it is cheaper to elaborate bauxite cermet than alumina cermet. This fact is evidenced by the following example. Assuming that two cermets are elaborated, one having the following compositions: 71% Fe, 16% Cr, 13% bauxite, and the other having a similar composition but wherein the bauxite is replaced by a quantity of alumina which corresponds to the alumina content of bauxite, the two ceramic components having the same granulometry, all the steps of the sintering process being accomplished under the same conditions, that is, powder mixing time two hours, moulding pressure 28,450 p.s.i., sintering temperature 1,420° C. (2,588° F.), sintering time one hour, under these conditions, the bauxite cermet provides a material having a 6.3 density with less than 8% porosity, and with alumina a material having a 4.5 density and more than 30% porosity, that is, a material without cohesion which is practically useless. To obtain equivalent densities with alumina, the conditions of the process are more expensive; thus, notably, moulding pressures about four times higher and sintering times four to five times longer are required.

The cost of these two materials is therefore not comparable, and the same remark applies to the practical properties even when this comparison is made with alumina cermet obtained through the most expensive methods and under the best quality conditions. The few measurements of thermal properties expressed in MKH units (meter-kilogram-hour) hereunder for the aforesaid compositions show clearly the specific character imparted to cermet by the presence of bauxite. The coefficient of thermal conductivity is 25 for bauxite cermet and only 13 for alumina cermet, the coefficient of thermal diffusivity defined by the square root of the ratio of the coefficient of thermal conductivity to the product of the specific heat by the density of the material considered, is .18 against .14, the coefficient of thermal absorption being 140 against 90. These figures show clearly the specific character of bauxite cermets and their superiority.

Figure 2:
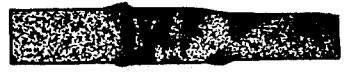
Figure 3:
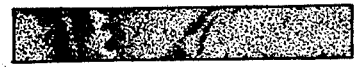

Another test proving the exceptional and specific resistance of the material constituting the subject-matter of this invention is illustrated in the accompanying drawing. This drawing illustrates immersion samples having been immersed during the same two-minute period in a bath of liquid cast iron heated at 1,400° C. (2,552° F.). It will be seen that the bauxite cermet sample shown in FIG. 3 had an exceptional resistance, the bar being unaltered and preserving its sharp edges, whereas the bar of FIG. 2, having same composition but with alumina was strongly attacked. By way of comparison, it will be seen that a 13% Cr ferritic steel (FIG. 1) was practically dissolved during the test.

The cermet composition given hereinabove should not be construed as limiting the invention, for departures from this precise composition may be contemplated, provided that the proportions lie within the following ranges: 40% to 80% Fe, 5% to 30% Cr, 5% to 65% bauxite. The bauxite to be used in the preparation of cermet should have a high alumina content and a low silica content, but the presence of iron oxide is not detrimental. As an example, a bauxite composition particularly adequate and used in the example cited hereinabove is as follows: loss at fire 14%, silica 4%, titanium oxide 2%, iron oxide 5%, alumina 74%, miscellaneous 1%. This bauxite composition given by way of example should not be construed as limiting the invention, and the following composition limits should be adhered to for preparing the material constituting the subject-matter of this invention:

$55\% < Al_2O_3$
$1\% < SiO_2 < 12\%$
$0.5\% < TiO_2 < 6\%$
$0.5\% < Fe_2O_3 < 15\%$
$7\% <$ miscellaneous, and water $< 30\%$ The bauxite may be utilized without any preliminary treatment, but it is preferable to calcinate it beforehand either in ordinary atmosphere or in a hydrogen medium at a temperature ranging in either case from 600° C. to 1,250° C. (1,112° F. to 2,282° F.).

The cermet according to this invention is prepared as follows:

Irrespective of the type of bauxite utilized, whether calcinated or not, it is always crushed for example, in a ball mill, and then sieved. The fraction having a grain size ranging from 20 to 40 microns is particularly suitable for subsequent incorporation in the mixer with the metallic component elements. This grain size is not compulsory but in any case the bauxite particles should be smaller than 140 microns. The grain sizes of the metal powders constituting the cermet are those known and conventional in the technique of powder metallurgy.

The specific properties of Fe-Cr-bauxite cermets are due to the presence of buaxite, but this invention is not limited to cermets wherein Fe and Cr are the metals associated with the bauxite. The same properties are obtained by using other refractory alloys in which bauxite is incorporated, such as: Fe=65%; Cr=14%; Al=6%; bauxite=14%.

In general, all refractory alloys may constitute the metal phase, provided that they contain a minimum quantity of Cr or Al taken separately or together to form more than 5%. It is also recommended that these alloys have a coefficient of thermal expansion that does not depart appreciably from that of bauxite, and in this respect ferritic alloys are more adapted to constitute the metal element of the cermet than austenitic alloys.

The precise sintering conditions set forth hereinabove in the example of the 71% Fe, 16% Cr and 13% bauxite alloy should also not be construed as limiting the invention; thus, according to the specific use for which the cermet is intended, it is possible to increase or reduce its porosity as well as its compactness; for instance, with a 100 kg./mm.$^2$ (142,230 p.s.i.) pressure a very low porosity (3%) is obtained with the 71% Fe, 16% Cr and 13% bauxite cermet. However, in all cases the moulding pressure should range from 5 to 100 kg./mm.$^2$ (7,110 to 142,230 p.s.i.) and the sintering temperatures should range from 1,100° to 1,500° C. (2,012° to 2,732° F.). The sintering time should range from 30 minutes to two hours for small parts, and extended to a period of from two to ten hours for bulkier parts. The sintering operation should be conducted in a reducing or neutral atmosphere, or in vacuo. If desired, according to the future use contemplated for the cermet, the latter may be protected by a conventional protective coating applied periodically either with a brush or by spraying in the form of a powder cloud, or by means of a bellows, in the form of a smoky flame, or through any known or conventional means. The coating may consist of alumina, silica or silicoaluminate, graphite, lampblack, acetylene black, etc.

I claim:
1. Novel sintered cohesive and refractory material consisting of a metallic phase and of a ceramic phase, the ceramic phase consisting in all cases of a high-alumina bauxite, with the following composition before sintering:

$55\% < Al_2O_3$
$0.5\% < TiO_2 < 6\%$
$0.5\% < Fe_2O_3 < 15\%$
$1\% < SiO_2 < 12\%$
$7\% <$ water and miscellaneous $< 30\%$ and the metal phase being selected from the group consisting of a refractory metal and a refractory alloy containing at least 5% of a metal selected from the group consisting of Cr, Al, and mixtures thereof.

2. Method of producing a cohesive and refractory material, consisting of a metallic phase and of a ceramic phase, the ceramic phase consisting in all cases of a high-alumina bauxite, with the following composition before sintering:

$55\% < Al_2O_3$
$0.5\% < TiO_2 < 6\%$
$0.5\% < Fe_2O_3 < 15\%$
$1\% < SiO_2 < 12\%$
$7\% <$ water and miscellaneous $< 30\%$ and the metal phase being selected from the group consisting of a refractory metal and a refractory alloy containing at least 5% of a metal selected from the group consisting of Cr, Al, and mixtures thereof, which comprises the steps of crushing and sieving the bauxite to a particle size less than 140 microns, mixing the bauxite particles in a proportion of from 5% to 65% with the metal phase, homogeneously distributing the mixture and compressing it in a mould under pressure of 5 to 100 kg./mm.$^2$, sintering the agglomerates thus produced at a temperature ranging from 100° to 1,500° C. in a non-oxidizing atmosphere.

3. A surface protected by a sprayed layer of the substance defined in claim 1, the minimum thickness of the sprayed layer being .004".

4. Substance according to claim 1, wherein the ceramic phase consists of bauxite in a proportion of 5% to 65% and the metal phase consists of a ferritic chromium alloy containing 5% to 30% chromium.

5. Substance according to claim 4, wherein the metal phase consists of an alloy comprising 45% to 75% Fe, 0% to 2% Cr, 3% to 12% Al, the Cr+Al content being at least 5%.

6. Substance according to claim 1, wherein the metal phase consists of chromium.

7. Substance according to claim 1, wherein the metal phase consists of aluminum.

8. A method as defined in claim 2, wherein said bauxite is calcined at a temperature of 600° C. to 1250° C. before crushing.

9. A method of protecting a surface which comprises spraying upon said surface a coating having a minimum thickness of 0.004" of a cohesive and refractory material, consisting of a metallic phase and of a ceramic phase, the ceramic phase consisting in all cases of a high-alumina bauxite, with the following composition before sintering:

$55\% < Al_2O_3$
$0.5\% < TiO_2 < 6\%$
$0.5\% < Fe_2O_3 < 15\%$
$1\% < SiO_2 < 12\%$
$7\% <$ water and miscellaneous $< 30\%$ and the metal phase being selected from the group consisting of a refractory metal and a refractory alloy containing at least 5% of a metal selected from the group consisting of Cr, Al, and mixtures thereof.

10. A method as defined in claim 9, wherein the substance sprayed is in the form of a homogeneous mixture in powder form of said ceramic phase and said metallic phase.

11. A method as defined in claim 9, wherein the substance sprayed is a powder produced by crushing the product produced by sintering a homogeneous mixture of said metallic phase and said ceramic phase.

12. A method as defined in claim 9, wherein the substance sprayed is in the form of sintered bars.

References Cited by the Examiner
UNITED STATES PATENTS

| | | | |
|---|---|---|---|
| 1,001,571 | 8/11 | Allen | 106—65 |
| 1,856,303 | 5/32 | White | 75—206 |
| 1,942,431 | 1/34 | Jung | 106—65 |
| 2,568,157 | 9/51 | Lepp et al. | 29—182.5 |
| 2,829,427 | 4/58 | Tacvorian et al. | 29—182.5 |
| 3,016,311 | 1/62 | Stackhouse | 29—182.5 |
| 3,044,867 | 7/62 | Edström | 75—206 |
| 3,061,482 | 10/62 | Grant | 75—206 |

OTHER REFERENCES

Minerals Yearbook, vol. 1, 1953, prepared by the staff of the Bureau of Mines, Division of Minerals, U.S. Government Printing Office, Washington, 1956, pages 633–634.

CARL D. QUARFORTH, *Primary Examiner.*

REUBEN EPSTEIN, OSCAR R. VERTIZ, *Examiners.*